(12) United States Patent
Booth et al.

(10) Patent No.: US 11,685,003 B2
(45) Date of Patent: Jun. 27, 2023

(54) METHOD FOR LASER MACHINING INSIDE MATERIALS

(71) Applicant: Oxford University Innovation Limited, Oxford (GB)

(72) Inventors: Martin James Booth, Oxford (GB); Patrick Salter, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 481 days.

(21) Appl. No.: 16/636,361

(22) PCT Filed: Aug. 7, 2018

(86) PCT No.: PCT/GB2018/052256
§ 371 (c)(1),
(2) Date: Feb. 4, 2020

(87) PCT Pub. No.: WO2019/030520
PCT Pub. Date: Feb. 14, 2019

(65) Prior Publication Data
US 2020/0164470 A1 May 28, 2020

(30) Foreign Application Priority Data
Aug. 7, 2017 (GB) ..................... 1712639

(51) Int. Cl.
*B23K 26/53* (2014.01)
*B23K 26/0622* (2014.01)
(Continued)

(52) U.S. Cl.
CPC ............ *B23K 26/53* (2015.10); *B23K 26/032* (2013.01); *B23K 26/046* (2013.01);
(Continued)

(58) Field of Classification Search
CPC .... B23K 26/53; B23K 26/032; B23K 26/046; B23K 26/0604; B23K 26/0622;
(Continued)

(56) References Cited

U.S. PATENT DOCUMENTS

| 5,287,165 A | 2/1994 | Ulich et al. |
| 2004/0070761 A1 | 4/2004 | Horvath et al. |

(Continued)

FOREIGN PATENT DOCUMENTS

| EP | 0545133 A2 * | 11/1992 | ............ G11B 7/09 |
| EP | 0 545 133 A2 | 6/1993 | |

(Continued)

OTHER PUBLICATIONS

Machine translation of WO 2006021442 A1 performed on Mar. 31, 2022, Hartmann et al. (Year: 2006).*

(Continued)

*Primary Examiner* — Brian W Jennison
*Assistant Examiner* — Kevin Guanhua Wen
(74) *Attorney, Agent, or Firm* — Thomas|Horstemeyer, LLP

(57) ABSTRACT

The invention provides a method for laser modification of a sample to form a modified region at a target location within the sample. The method comprises positioning a sample in a laser system for modification by a laser; measuring tilt of a surface of the sample through which the laser focusses; using at least the measured tilt to determine a correction to be applied to an active optical element of the laser system; applying the correction to the active optical element to modify wavefront properties of the laser to counteract an effect of coma on laser focus; and laser modifying the sample at the target location using the laser with the corrected wavefront properties to produce the modified region.

22 Claims, 3 Drawing Sheets

(51) Int. Cl.
*B23K 26/70* (2014.01)
*B23K 26/03* (2006.01)
*B23K 26/046* (2014.01)
*B23K 26/06* (2014.01)
*B28D 5/00* (2006.01)

(52) U.S. Cl.
CPC ...... *B23K 26/0604* (2013.01); *B23K 26/0622* (2015.10); *B23K 26/0626* (2013.01); *B23K 26/0648* (2013.01); *B23K 26/705* (2015.10); *B28D 5/0011* (2013.01)

(58) Field of Classification Search
CPC ............ B23K 26/0626; B23K 26/0648; B23K 26/705; B23K 26/064; B28D 5/0011
See application file for complete search history.

(56) References Cited

U.S. PATENT DOCUMENTS

| | | | | |
|---|---|---|---|---|
| 2006/0196858 | A1* | 9/2006 | Barron et al. | B23K 26/00 219/121.69 |
| 2009/0170042 | A1* | 7/2009 | Kanda et al. | G03F 7/20 430/325 |
| 2010/0294749 | A1 | 11/2010 | Kempe et al. | |
| 2011/0266261 | A1 | 11/2011 | Nakano et al. | |

FOREIGN PATENT DOCUMENTS

| | | | | |
|---|---|---|---|---|
| GB | 2501117 | A | | 10/2013 |
| GB | 2540537 | A | | 1/2017 |
| JP | H 05-144056 | A | | 6/1993 |
| JP | 2008-531143 | A | | 8/2009 |
| JP | 2010-125507 | A | | 6/2010 |
| JP | 2010125507 | A | * | 6/2010 ............. B23K 26/03 |
| JP | 2013-027930 | A | | 2/2013 |
| JP | 2014-503359 | A | | 2/2014 |
| KR | 100631048 | B1 | * | 10/2006 ........... B23K 26/066 |
| WO | WO 2006021442 | A1 | * | 3/2006 ........... B23K 26/032 |
| WO | 2006/092035 | A1 | | 9/2006 |
| WO | WO 2010024320 | A1 | * | 3/2010 ........... B23K 26/364 |
| WO | WO 2012080883 | A1 | * | 6/2012 ........... B23K 26/08 |
| WO | WO 2017051168 | A1 | * | 3/2017 ............. B22F 3/105 |

OTHER PUBLICATIONS

Machine translation of WO 2010024320 A1 performed on Apr. 1, 2022, Ito et al. (Year: 2010).*
Machine translation of KR 100631048 B1 performed on Mar. 31, 2022, Kim et al. (Year: 2006).*
Machine translation of JP 2010125507 A performed on Sep. 19, 2022, Nakano et al. (Year: 2010).*
International Search Report and Written Opinion for PCT/GB2018/052256, dated Nov. 15, 2018, pp. 1-11.
UK Search Report for GB 1712639.2, dated Feb. 13, 2018, pp. 1-6.
Japanese Office Action for Patent Application No. 2020-506743 dated Jun. 29, 2022, pp. 1-6 (Machine Translation Included).
Korean Office Action for Patent Application No. 10-2020-7006800 dated Nov. 2, 2022, pp. 1-9 (Machine Translation Included).

* cited by examiner

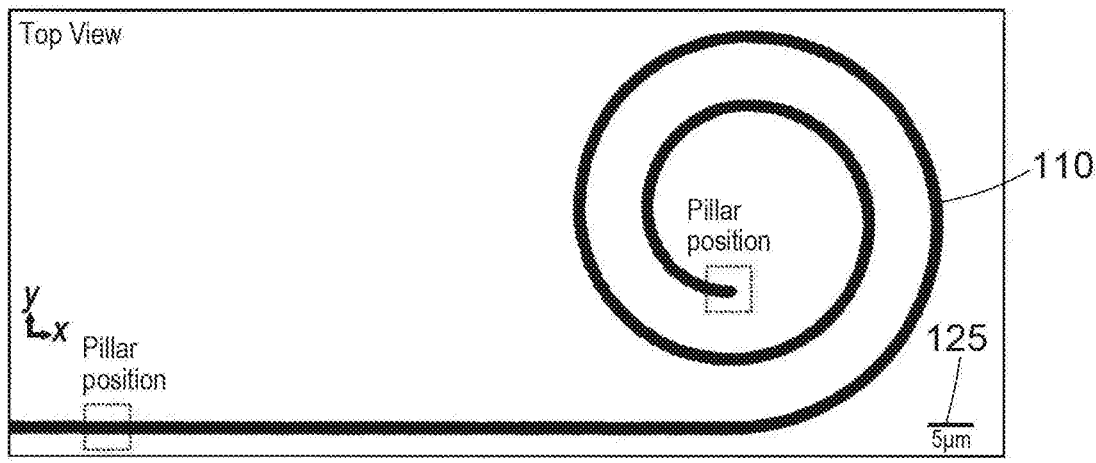
Fig. 1A
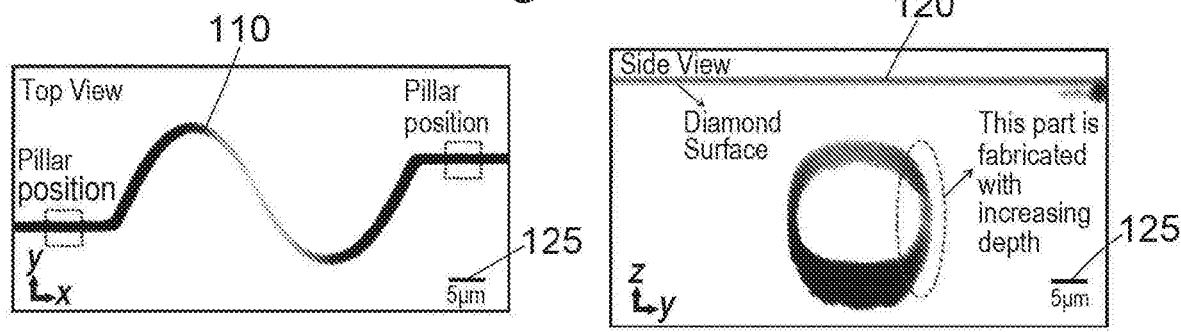
Fig. 1B
Fig. 1C
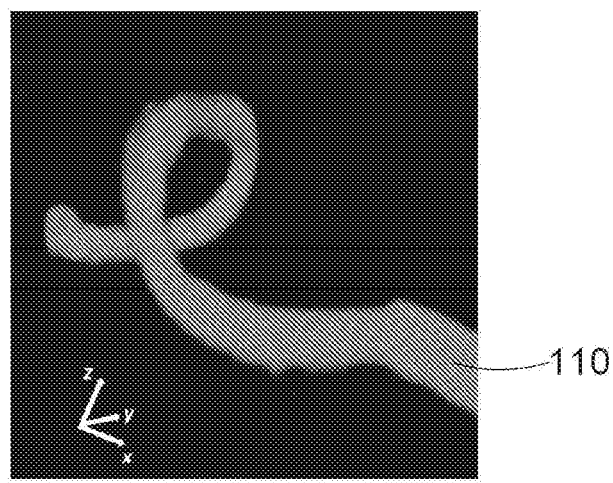
Fig. 1D

METHOD FOR LASER MACHINING INSIDE MATERIALS

CROSS-REFERENCE TO RELATED APPLICATIONS

This application is the National Stage of International Application No. PCT/GB2018/052256, filed Aug. 7, 2018, which claims priority to GB 1712639.2, filed Aug. 7, 2017, which are entirely incorporated herein by reference.

The invention relates to a method of laser machining inside materials, particularly a method of forming a modified region within a sample.

BACKGROUND

Laser machining is a process that is used widely in industry. Research developments in this area over the last decade or so have moved laser processing to much smaller length scales. This has been enabled by the use of pulsed lasers using pulse durations in the range of hundreds of femtoseconds to a few picoseconds and focusing through high numerical aperture lenses. The combination of energy confinement in the time and spatial dimensions leads to high instantaneous focal intensities that create material modifications through nonlinear optical processes. Processing effects may therefore be confined to focal regions.

It is therefore desirable to improve control over the size and shape of laser foci within a material in order to improve the degree of control afforded to laser machining techniques. However, the presence of a material in the path of a laser beam necessarily affects the laser (e.g. by refraction and/or reflection). Consequently, when trying to focus within a material, the material itself disrupts the laser focusing within itself.

SUMMARY

According to a first aspect of the present invention there is provided a method for laser modification of a sample to form a modified region at a target location within the sample, comprising: positioning a sample in a laser system for modification by a laser; measuring tilt of a surface of the sample through which the laser focusses; using at least the measured tilt to determine a correction to be applied to an active optical element of the laser system; applying the correction to the active optical element to modify wavefront properties of the laser to counteract an effect of coma on laser focus; and laser modifying the sample at the target location using the laser with the corrected wavefront properties to produce the modified region.

Light focused from an objective lens into a sample will be aberrated from its ideal focus because of refraction at the sample's surface. The larger the difference between the refractive indices of the immersion medium (e.g. air, oil, etc.) and the sample, the larger the aberrating effect on the focus. The determined correction therefore accounts for the effects of refraction at the sample surface in order to counteract the destructive aberrating effect of the sample. Different factors can contribute to different types of aberrations (or aberration modes) on the focus. A surface which is tilted with respect to a focusing objective lens will not typically permit an ideal focus and instead will distort the focus by coma aberration. Usually the incident surface is leveled as far as possible and the resulting distortion is accepted, but for some applications (e.g. focusing inside a gem stone) it may be difficult to obtain a perfectly level surface, or it may be advantageous to focus through a tilted surface. Hence, by measuring the tilt of the sample, its effects on the focus can be counteracted by the correction applied to the active optical element, and the efficiency of the focusing can be improved.

The disclosed method of aberration correction may achieve a laser focus within the sample having a Strehl ratio of greater than 0.5. The method may include modifying the sample using a laser focus with a Strehl ratio of greater than 0.5. The focus may have a Strehl ratio of greater than 0.6, greater than 0.7, greater than 0.8, or greater than 0.9. The Strehl ratio may be understood as a measure of how close a focus is to its ideal (i.e. diffraction limited) focus. A laser focus limited only by the inherent diffraction of the focusing system (i.e. a laser focus the size of the diffraction limit) would have a Strehl ratio of 1. In practice, inherent flaws in an optical system will result in a focus which is not the size of the diffraction limit and which will therefore have a Strehl ratio of less than 1. A Strehl ratio of about 0.1 is typical for a laser focused at e.g. a depth of 100 μm in a diamond sample for a high NA lens. The Strehl ratio may therefore be understood as a measure of the effect of aberration on a laser focus, with ratios closer to 1 being less affected by aberrations and flaws in the system. It may also be understood as a measure of the efficiency of a given focus.

The Strehl ratio may be defined as the peak focal intensity relative to that when there are no aberrations present in the system. When a focus simply limited by diffraction has a peak intensity $I_0$ and a real system has peak intensity $I_p$ the Strehl ratio is defined as the ratio $I_p/I_0$. If aberrations are present in a system, wavefront errors diffract light away from the focus and reduce the actual peak intensity $I_p$ from the theoretical maximum $I_0$, thus reducing the Strehl ratio. If the wavefront error is characterised as an aberration phase function φ, the Strehl ratio S is given by:

$$S = \frac{I_p}{I_0} = |\langle e^{i\varphi}\rangle|^2$$

where the angled $\langle \ldots \rangle$ brackets denote an average over a particular aperture in the optical system, taken here as the pupil aperture of the focusing objective lens. For a perfect system, the wavefront error is zero (flat phase) and the Strehl ratio is 1. If the wavefront error increases due to aberration the Strehl ratio decreases. The aberration function describes all phase errors related to the propagation of light toward the focus, and may be written as a sum of Zernike polynomials such as primary coma, primary spherical and primary astigmatism. The aberration function may alternatively be composed as a sum of another set of basis functions, or as a direct numerical computation/analytical solution for a particular focusing location inside a known sample.

The method may comprise measuring a focus of the laser within the sample, for example by photoluminescence within the sample, and modifying the correction applied to the active optical element based on the measured focus to thereby improve the efficiency of the focusing and/or to increase the Strehl ratio of the focus.

The sample may comprise a flat surface through which laser light will be incident and which will cause the aberration.

A modified region may be any region within the sample that has undergone change due to exposure to the laser. Typically, a modified region will comprise different properties and may comprise different optical, structural, mechanical, electrical etc. properties from the bulk material surrounding it.

An active optical element is any element which may dynamically modify the properties of light incident thereon. For example, spatial light modulators (SLMs), deformable mirrors (or micro-deformable mirrors), and adaptive lenses are active optical elements which may be used to dynamically impose spatially varying modulations on a laser beam's profile to thereby control e.g. its phase and/or propagation properties.

Measuring tilt of the sample may include measuring the inclination of the sample surface from the propagation of the laser beam, and/or may include measuring the inclination (i.e. tilt) with respect to both horizontal directions (i.e. the two orthogonal dimensions transverse to the laser beam propagation). Measuring tilt of the sample may include measurement of the inclination of the sample surface from a transverse plane of the objective lens. Measurement of the sample therefore provides information on what aberrations will affect the system focus. Measurement may be carried out by any suitable means, and may include reflection from the sample surface. Measurement may include reflection from a plurality of points on the sample incident surface.

The measurement may be done by imaging. The correct axial position for optimum focus (i.e. sharpest image) of the surface of the sample may be found at three different locations. This may be accurate axially to about 0.5 μm. The three points may be separated in the transverse direction by about 0.2 mm. The separation distance may be large enough to make an accurate measurement of the tilt, given the range of tilts which are expected to be important. For example, for diamond tilt in the range greater than 0.5 degrees may have significant effects on the quality of a focus within the sample.

Other methods may be used for doing the measurement. If the system is using an oil immersion objective, a similar method may be used to perform the same measurement as above but instead of using the sharpest focus to ascertain the axial position of the sample surface (which can be a problem with some samples as the surface can be polished so there is nothing clear to image), the laser can be used to boil the immersion oil. That is, when the laser focus is inside the immersion oil, it boils the oil, and when the laser focus moves inside the sample nothing is visible. In this case, the pulse energy would be below the threshold for fabrication within the sample. This approach has roughly the same axial accuracy as the imaging approach, but may be easier to implement in some cases. However, it only works for oil based lenses.

Another method to measure the axial location of the sample surface relies on reflection from the surface. This may be from the fabrication laser itself (when pulse energy is sub-fabrication threshold) or from an alternative light source (e.g. a laser or LED). The surface of the sample may be located when the reflected signal is maximum.

Another method may include looking at third harmonic generation (THG) from the sample surface, which is again maximised when the surface is in the focus of the lens. An interferometric measurement may be used with the reflected light to give a very accurate measurement of the surface position (an alternative coherent source would be needed for the interferometer).

Another alternative method is imaging the reflection of the laser beam from the diamond surface onto a camera, the transverse displacement of the reflection on the camera allows one to determine the tilt of the sample from a single measurement.

Determining the correction to apply to the active optical element uses at least the measured tilt. It may also include determining a correction based on the depth of the region to be modified below the surface of the sample. Determining a correction may include using information pertaining to the optical properties of the sample material in order to account for refraction.

The method may include laser modifying the sample to form visible features.

The method may comprise measuring the position of the sample within the laser system; using also the measured position to determine the correction to be applied to the active optical element of the laser system; and applying the correction to the active optical element to modify wavefront properties of the laser to counteract an effect of spherical aberration on laser focus. The method may comprise measuring the position of the surface of the sample on which the laser is incident so as to determine a focusing depth. The method may further comprise determining the correction based at least in part on the focusing depth.

Therefore, as well as correcting for coma caused by the tilt of the sample, the correction may account for spherical aberration. Spherical aberration is another type of aberration in addition to coma. The amount of spherical aberration may be proportional to the focusing depth. Spherical aberration distorts a point focus into a cusped shape and by doing so moves a peak intensity of the focus axially towards the aberrating surface and away from its ideal position. A focus which is affected by spherical aberration will therefore have a peak intensity closer to the sample surface. This movement of the focus is also known as defocus. By measuring the position of the sample, the correction may be determined so as to counteract the effects of spherical aberration. The method may comprise changing the axial position of the sample to account for the movement of the peak intensity of the focus. The method may comprise changing the axial position of the sample to account for a defocus component of the spherical aberration.

Hence the method may include applying a single wavefront correction to account for the effects of both coma and spherical aberration caused by refraction at the sample's surface.

The method may comprise measuring the sample after forming the modified region, and modifying the correction applied to the active optical element based on the further measurement. The method may comprise measuring the modified region of the sample and modifying the correction based upon the measurement of the modified region. Therefore, the method may include a feedback stage during which the correction applied to the active optical element is refined e.g. to more closely control the size and shape of the focus, and further reduce the effects of aberration (e.g. coma and/or spherical aberration) on the focus. Refinement of the correction may achieve a larger Strehl ratio. The further measurement may use non-linear photoluminescence excitation which may be from intrinsic defects within the sample. The method may comprise detecting the effects on the sample of the laser modification using photoluminescence, plasma emission or absorption, or reflection or transmission properties.

The step of determining a correction may comprise calculating the correction on the fly. It may comprise using the measured tilt in the calculation for correcting the coma, and where applicable the measured position for correcting the spherical aberration. In this way, a tailored correction may be calculated for each sample sample.

The step of determining a correction may comprise selecting the correction from a database of available corrections. Hence the method may include selecting a specific correction to apply to the active optical element when e.g. the tilt of the sample is within a predetermined range, and/or the position of the sample is within a predetermined range. The database may comprise a plurality of corrections, each for a pre-determined range of factors.

The correction may be defined by an expansion of orthogonal modes. Each mode may define an aberration mode. The correction may be a pure mode, or the correction may be a superposition of modes. The correction may be defined by a Zernike polynomial, or may be defined by an expansion of Zernike polynomials.

The correction may comprise a phase field for modulating a laser beam profile to a desired profile. For example, the method may use a spatial light modulator (SLM) and the correction may represent a display field for an SLM. The method may use a deformable mirror (DM) and the correction may be a configuration for the deformable mirror. The correction may be a configuration for an adaptive lens.

The step of determining a correction may be based at least in part on a pulse energy of the laser. The correction may therefore take into account horizontal and vertical coma, spherical aberration, and pulse energy. The pulse energy may be selected based upon the correction. The method may comprise determining a pulse energy to be used based on the correction and sample, and may include modifying the sample using a laser pulse of the determined pulse energy.

If the correction is sufficient, the same pulse energy may be used to fabricate anywhere within the sample and give the same result. This is typically the case for the aberration ranges considered in this disclosure. However, if the correction is not sufficient (e.g. if active optical element lacks sufficient range or degrees of freedom to accurately display the required phase to counteract the aberration) then the pulse energy may be increased.

If the correction is not sufficient, the pulse energy may be raised for fabrication. If the aberration is substantial and the correction is far from sufficient to counteract it completely the pulse energy may be raised substantially. In some materials (e.g. particularly in diamond) if the correction is insufficient, it is not possible to accurately and reliably fabricate no matter how high the pulse energy is raised. For example, at a depth of about 250 μm in diamond, even if the spherical aberration is perfectly corrected but a small coma aberration (e.g. of about 1 rad) is not, single pulse laser fabrication is not experimentally observed. The pulse energy may be raised very high and still fabrication may not be achieved with a single pulse. In such a case, fabrication cannot be achieved deterministically. Instead, the dose (i.e. the number of pulses per modified region) must be increased and the resulting fabrication is large (e.g. greater than 5 μm) and poorly defined. Moreover, the required dose will vary unpredictably at different locations within the diamond.

Determining the correction may comprise optimising a predetermined function. The method may comprise using an algorithm to determine the correction based upon various factors pertaining to the sample in question. The factors may include coma, spherical aberration and pulse energy. Determining the correction may comprise selecting a desired correction from a three-dimensional search space, or a four dimensional search space or a higher-dimensional search space based upon factors including any combination of the vertical coma, horizontal coma, spherical aberration and pulse energy. The method may include minimising a cost function (and/or maximising a merit function).

The method may include simultaneously modifying spatially separate regions within the sample. The method may include consecutively modifying separate regions within the sample using the same pulse energy to modify each region.

The step of applying the correction to the active optical element may comprise changing a display of the active optical element. The active optical element may be an SLM, a DM, or an adaptive lens (e.g. fluidic or acousto-optic) or other transmissive or reflective adaptive optical element. The method may comprise sending a signal to the adaptive optical element including data defining the correction, and causing the SLM or DM to alter its state so as to impose the correction on an incident laser beam profile.

The method may comprise laser modifying the sample using a plurality of laser beams and an array of foci. The method may comprise simultaneously modifying spatially separate regions of the sample using respective laser beams. The method may comprise using a plurality of pulses, each pulse from a respective laser beam in order to modify desired regions of the sample. The method may include forming the plurality of beams prior to correction by the adaptive optical element, and hence the method may include using a single adaptive optical element to perform aberration correction on a plurality of spatially separate laser beams. The method may include creating the plurality of laser beams using the adaptive optical element, such that aberration correction and multiple beam generation are simultaneous.

The step of forming a modified region may include using non-linear optical interactions to cause modification of the material. The method may comprise modifying only material within the bulk of the sample. Hence, the method may include not modifying a surface of the sample. The method may include modifying the sample at a depth of more than 50 micrometres, or more than 150 micrometres, or more than 300 micrometres.

The method may comprise forming complex structures within the sample. For example, the method may comprise forming within the sample an array of features. The method may comprise moving the sample during laser modification to create a line feature within the sample that may be straight or curved or any suitable shape. The method may comprise scanning the laser during laser modification to create a line feature within the sample that may be straight or curved or any suitable shape. The method may comprise forming an optical volume formed of spaced points, and/or may comprise forming a diffractive element. The method may comprise modifying spatially separate regions within the bulk of the material. The method may comprise making visible features within the sample. The method may comprise forming a structure within the sample. The method may comprise forming a large-scale feature, for example greater than 5 micrometres, or greater than 20 micrometres, in at least one dimension. The method may include modifying predetermined regions of the sample to generate a desired stress field within the sample. The method may include creation of features within the sample which shift the phase of incident light, which features may be visible by phase contrast microscopy, or which may scatter the light so that the features may be visible in dark field microscopy. The method may include modifying the refractive index of the sample in a predetermined region, and may achieve this by exposing that region to the laser, or by exposing proximate regions to the laser to change a strain field of the predetermined region to modify its refractive index.

The method may comprise using a high numerical aperture (NA) lens to focus the laser within the sample. This may exacerbate the effects of spherical aberration. The method may comprise using an objective lens without an immersion medium (i.e. a dry lens), or may comprise using an objective lens with an immersion medium (e.g. oil). The method may comprise using an objective lens with a numerical aperture of greater than about 0.5. The method may comprise using an objective lens with a numerical aperture of greater than about 0.8. The method may comprise using an objective lens of greater than 0.8 NA if dry, or greater than 1.2 NA if in an oil immersion.

The method may comprise modifying a gemstone, or may comprise modifying a crystal lattice. In particular, the method may comprise using a sample which comprises diamond. The diamond may be in the form of a gemstone. The method might be used to mark the gemstone e.g., as a security device.

The method may comprise creating electrical conductors within the sample, in particular diamond. The diamond may be a grown diamond substrate. The method may comprise coating the sample (e.g., diamond) in metal, e.g., to provide electrical connections to electrical conductors within the sample. The method may comprise converting carbon from an sp3 phase to an sp2 phase, thereby modifying the diamond structure. The method may include modifying a region within the diamond that meets the diamond surface.

The correction may be defined by an expansion of orthogonal modes. Each mode may define an aberration mode. The correction may be a pure mode, or the correction may be a superposition of modes. The correction may be defined by a Zernike polynomial, or may be defined by an expansion of Zernike polynomials. The phase correction may be defined as a superposition of modes using an orthogonal basis other than the Zernike polynomials. The phase correction may be an analytic solution e.g. for a particular geometry, or a numerical solution for a particular focusing geometry. The phase correction might be determined through an iterative optimisation using a method of focal feedback. The phase correction may be defined as a superposition of modes using an orthogonal basis other than the Zernike polynomials. The phase correction may be an analytic solution e.g, for a particular geometry, or a numerical solution for a particular focusing geometry. The phase correction might be determined through an iterative optimisation using a method of focal feedback.

The method may comprise calculating coefficients of a Zernike expansion in order to characterise the aberration modes and determine a correction. Applying the correction to the active optical element may comprise applying a superposition of Zernike modes thereto. The amplitude of the Zernike modes may be defined by the correction. The correction may be a single mode, or a superposition of modes.

The correction may counteract the effects on the focus of a tilt aberration mode caused by the sample, which tilt aberration mode is distinct from the coma aberration mode caused by tilt of the sample. The different aberration modes are characterised by different orders of phase change that they cause. The tilt aberration mode is characterised by a different order of phase change than coma. The spherical aberration mode is characterised by a different order of phase change than coma and tilt. Determining a correction may comprise determining which aberration modes will be introduced to the laser focus by the sample.

For example, a tilt aberration can be described in the pupil of the optical system as a phase variation proportional to r $\cos(\theta-\xi)$ where $(r, \theta)$ are the polar coordinates in the pupil plane and $\xi$ represents the orientation of the tilt. A coma aberration has components of the form $r^3 \cos(\theta-\xi)$ where the phase varies with the third power of the radial coordinate. Higher order radial terms with odd powers may also be present.

The method may comprise using a pulsed laser with pulse energies of between 10 nJ and 300 nJ. The pulse energies may be between 80 nJ to 150 nJ. The pulse energy may be greater than the threshold for modification for the sample material. The method may include using a laser with wavelength in the UV, visible, or infrared spectra. The method may include using a laser with a wavelength in the near infrared spectrum.

The method may comprise laser modifying the sample using a single laser pulse. The method may comprise modifying the sample using a plurality of pulses. The pulse may be a femtosecond pulse or a picosecond pulse. The method may include varying the pulse energy between doses.

The method may comprise modifying a region less than 1 micrometre in the propagation direction. The method may comprise modifying a region less than 1 micrometre in each of the x-, y- and z-directions.

According to another aspect of the invention there is provided a method for laser modification of a gem stone to form a modified region at a target location within the gem stone, comprising: positioning a gem stone in a laser system for modification by a laser; measuring a focus of the laser within the gem stone; using at least the measurement of the focus to determine a correction to be applied to an active optical element of the laser system; applying the correction to the active optical element to modify wavefront properties of the laser to counteract an effect of aberration on laser focus: and laser modifying the gem stone at the target location using the laser with the corrected wavefront properties to produce the modified region.

Applying the correction to the active optical element may result in a laser focus with a Strehl ratio of greater than 0.5, greater than 0.6, greater than 0.7, greater than 0.8, or greater than 0.9. Hence the effects of aberration on the laser focus may be significantly reduced. The correction may counteract spherical aberration and/or coma aberration.

According to another aspect of the invention there is provided a sample modified by any of the methods as described above.

The sample bulk may be diamond. The sample may comprise electrical conductors. The modified region may comprise a security code. The modified region may comprise a diffraction grating. The modified region may be less than 1 micrometre in all dimensions (i.e. less than 1 micrometre in width, height and depth). The modified region may be more than 100 micrometres below the nearest surface of the sample, preferably more than 200 micrometres, and more preferably more than 500 micrometres.

According to another aspect of the invention there is provided a laser system for laser modification of a sample to form a modified region at a target depth within the sample, comprising: a measurement device arranged to measure tilt of a sample.

The laser system may be a femtosecond laser system or a picosecond laser system. The laser system may comprise a processor and an active optical element, wherein the processor is configured to determine a correction to be applied to the active optical element using measured tilt of the laser system, and to communicate the correction to the active optical element.

The active optical element may be configured to modify wavefront properties of the laser to counteract an effect of coma on laser focus. The active optical element may be configured to modify wavefront properties of the laser to counteract an effect of spherical aberration on laser focus. The active optical element may be configured to modify wavefront properties of the laser to counteract an effect of aberration on laser focus by refraction at the sample surface.

The laser system may be arranged to perform the method according to any of the first aspects.

LIST OF FIGURES

Embodiments of the invention are described below by way of example only and with reference to the accompanying drawings in which:

FIGS. 1A, 1B, 1C, 1D show a graphitic track written inside a diamond substrate from different perspectives;

DETAILED DESCRIPTION OF EMBODIMENTS

Figure 2A:
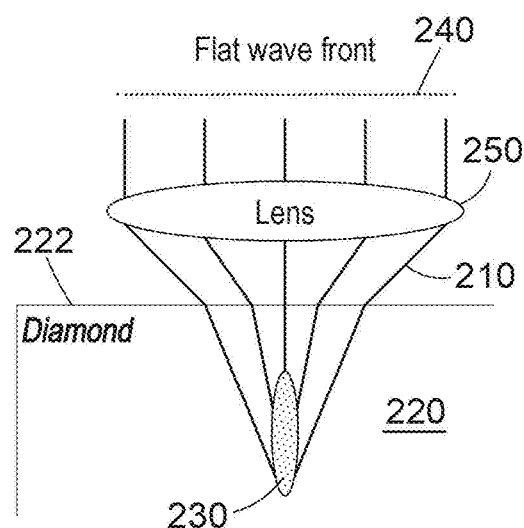
FIG. 2A shows a schematic example of a distorted focus within a substrate without using aberration correction.

In the following there is described a system and method for laser processing at high resolution inside transparent materials incorporating aberration correction to compensate for effects of refraction at the material surface. The system uses feedback from measurements of the material to optimise the aberration correction and focal intensity to obtain the necessary level of material modification. A particular application is for the fabrication of features inside diamond.

Applications of the disclosed method include the generation of light guides inside glasses through local increase of the refractive index. Similar structures may be created in crystals such as KDP or lithium niobate using localised increases in refractive index caused by stress fields around damaged tracks in the medium. Microfluidic devices may be created through exposure of glass followed by chemical etching. Nonlinear photopolymerisation may be used to create complex 3D polymer structures from appropriate solutions.

The disclosed method may be used to create modified regions within a material which are approximately the same size as a diffraction-limited laser focus, which may be less than 1 micrometre in all dimensions.

Fabrication in Diamond

When femtosecond pulsed lasers are focused tightly inside diamond, the non-linear optical interactions cause modification of the crystal lattice in various ways, dependent upon the energy density at the focus. At low energies, there is minor disruption of the crystal lattice that can be used to generate colour centres following annealing. At higher energies, there is significant lattice disruption to the extent that there is significant conversion of the carbon from the sp3 phase (diamond crystal structure) to the sp2 phase (graphite). Typically, the laser modified regions take the form of amorphous carbon, which is a combination of the sp2 and sp3 phases.

Fabrication of fine optical features in diamond uses short-pulsed lasers and high numerical aperture (NA) objective lenses. This ensures that features are well confined in three-dimensions within the material and there is no damage to the surface of the material. A single laser exposure can create a point-like feature of modified material. Complex structures, which may be two or three dimensional, can be built up using collections of point-like features. Alternatively, linear structures can be composed of closely spaced features.

There are two regimes for sub-surface laser processing inside diamond: (i) at very low pulse energy the highly non-linear interaction generates an ensemble of lattice vacancies at the laser focus, while (ii) at higher pulse energies, there is break-down of the diamond lattice leaving a conductive graphitic phase. Modifications of Regime (i) are invisible by transmission microscopy and can only be seen in a fluorescence microscope. They are an important precursor for the formation of coherent NV (nitrogen vacancy) centers for quantum applications. Regime (ii) modifications comprise small (<several 100 nm) clusters of sp2 bonded carbon accompanied by micro-cracks in the diamond lattice. Tracing the diamond through the laser focus in Regime (ii) enables the writing of continuous tracks of sp2 bonded carbon which can be used as electrically conductive wires.

The features formed without translation of the diamond during exposure take the form of an ellipsoid. The extent of the modification is longer along the direction of propagation for the fabrication laser and depends upon the NA (numerical aperture) of the objective lens used. The size of the features is also dependent on the pulse energy used and the dosage (number of pulses in the exposure). If the wavefront is well corrected as described here, highly regular modifications can be made from exposure to exposure. If the wavefront is not well corrected as described here, highly irregular modifications (in size and shape) can result from different exposures with the same conditions.

High NA optics (NA>~0.8) are used for fabrication both of features which are not axially extended (<2 μm along the optical axis) but also for reliable fabrication from point to point. Fabrication at lower NA (~0.5) may be possible but is heavily position dependent and inconsistent. At higher NA, the fabrication is highly repeatable over a large volume with exactly the same pulse energy and laser dose. There is no position dependence to the fabrication. This is important to industrial application.

Other demonstrations have consisted of graphitic point-like features in an array. In other applications, continuous graphitic structures have been generated that may be used as electrical conductors.

Tracing the diamond through the laser focus (or scanning the laser relative to a fixed diamond sample) enables the creation of continuous tracks of laser modified material. Working in fabrication Regime (ii), these tracks contain sp2 bonded carbon and are electrically conductive. They may be used to form conductive wires that run in 3 dimensions through the diamond. For example, FIG. 1 shows various continuous graphitic tracks 110 following 2D and 3D paths beneath the surface 120 of a diamond sample. FIG. 1A shows a top view of the graphitic track 110. FIGS. 1B and 1C show side views of the graphitic track 110, and FIG. 1D shows an imaged perspective view of the written graphitic track 110. Scale 125 shows 5 μm. The dashed ellipse in FIG. 1C shows a portion of the graphitic track which is fabricated with increasing depth.

Such graphitic tracks 110 may serve as conductive wires and are useful in the manufacture of diamond based sensors for radiation or chemical sensing. In one implementation, wires running through the diamond may have a voltage applied across them to set up a local electric field within the diamond. If ionising radiation is incident on the diamond, it may create free charge on passing through the diamond, which is collected by the electrodes. In another implementation, the embedded wires may be used for electrochemistry, taking advantage of the wide potential window of diamond. The embedded wires can be used to create an electric field near the surface of the diamond, which is then immersed in a solution. Such embedded laser-written wires can be connected to external electronics by bringing them up to the diamond surface, which is subsequently coated in metal for efficient electrical connection.

Aberration Correction

In the ideal case, the size of the laser focus should be at the diffraction limit i.e. the smallest spot size possible for a given wavelength, refractive index and numerical aperture of the objective lens. However, frequently this limit is not achieved due to the effects of aberrations. Aberrations are deviations of the optical system from its ideal focusing performance. In terms of ray optics, aberrations cause the rays in the focusing cone to no longer meet at the same point. In terms of wave optics, the wavefronts converging on the focus no longer take the form of the spherical cap required for focusing to a diffraction limited spot. In this wave optics case, the aberrations are often quantified in terms of the optical phase error between the ideal and distorted wave front, and different types of distortions are characterised by different phase errors. The effects of aberrations on the focus are to spread out or blur the focus while reducing its peak intensity. By the nature of focusing, the spreading takes place predominantly along the optical axis.

FIG. 2A shows an example of a type of particular aberration mode: spherical aberration. In laser fabrication, aberrations frequently occur due to the refraction of rays at the surface of the transparent material inside which one intends to fabricate. This could occur at the interface between, for example, the immersion medium of the objective lens (typically air, oil or other media) and the fabrication material. The light rays 210 which enter the sample 220 are refracted by the sample surface 222 and the resulting focus 230 is distorted and elongated. The flat wavefront 240 means parallel rays 210 enter the high NA lens 250, which would result in ideal focusing if the sample 220 were absent.

Figure 2B:
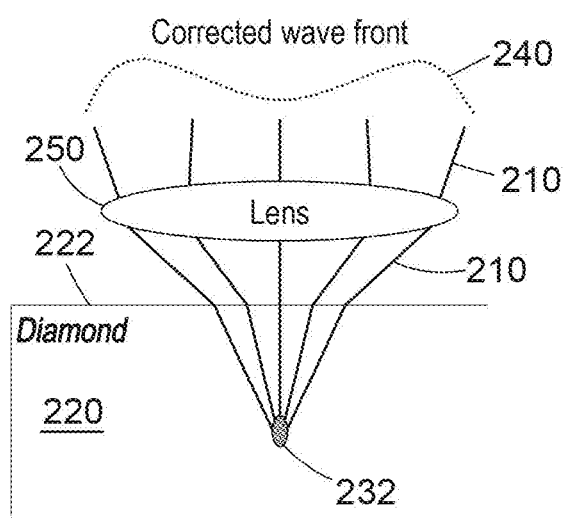
FIG. 2B shows a schematic example of a focus within a substrate achieved using aberration correction.

FIG. 2B shows the case where the wavefront 240 has already been corrected by an active optical element such as an SLM, which has modified its phase to counteract the refraction of the sample surface 222. As a consequence, in the absence of a sample 220 the rays 210 leaving the lens would not result in an ideal focus. However, given the presence of the sample, the rays 210 refract at the surface 222 and result in an improved focus 232. Therefore, by shaping the incident wavefront using adaptive optics the aberration is cancelled, allowing accurate focusing and reliable fabrication of sub micrometre features.

Figure 3A:
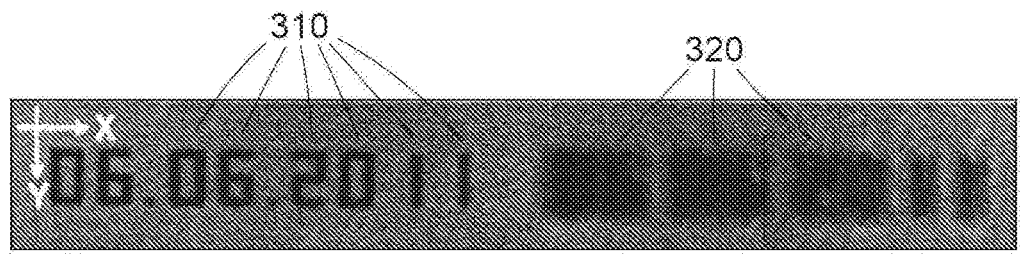
FIGS. 3A and 3B shows features written in a diamond substrate, the left-hand set of features were written using an aberration correction technique, while the right-hand set of features were written without using an aberration correction technique.
Figure 3B:
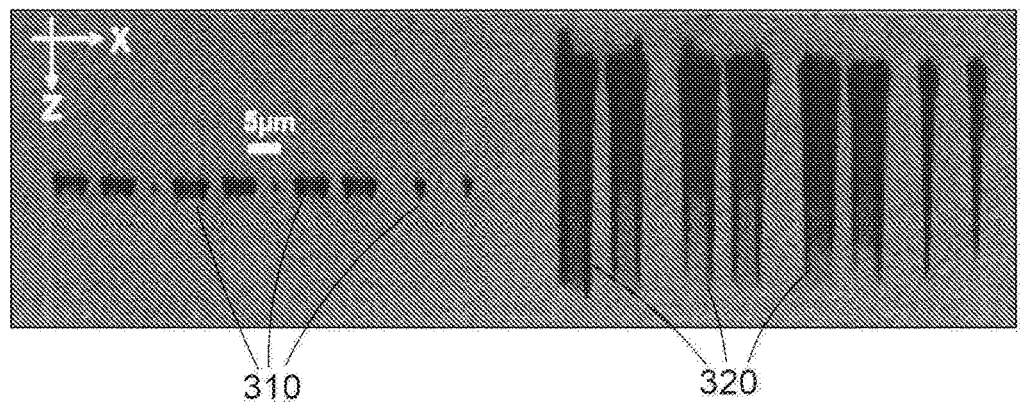

FIG. 3A shows fabricated features 310 (left) created by focusing inside diamond at a depth of 50 µm using adaptive optics aberration correction. Features 320 (right) are the same structure but made without aberration correction. The laser pulse energy had to be substantially increased to see any fabrication at all. The fabrication laser was incident along the z-axis. It will be see that the fabrication of features 310 is far better controlled than that of features 320. FIG. 3B shows the same features from the side. It will be appreciated that the features created using the aberration correction technique of the present invention are significantly better controlled in the propagation direction (i.e. the z-direction).

If the interface of the sample is normal to the optical axis, then the aberration consists of a refocusing effect (a focal shift along to optical axis) in addition to spherical aberration. The amplitude of these effects is proportional to the focusing depth. An expression for spherical aberration of this type is:

$$\varphi_{SA}(\rho) = \frac{-2\pi d_{nom}}{\lambda}\left(\sqrt{n_2^2 - (NA\rho)^2} - \sqrt{n_1^2 - (NA\rho)^2}\right)$$

This equation is an analytic description of the spherical aberration phase $\varphi_{SA}$ for light of wavelength $\lambda$ when focusing to a depth $d_{nom}$ inside a material of refractive index $n_2$, using an objective lens with numerical aperture NA and immersion medium $n_1$. The coordinate $\rho$ is the normalised radius in the pupil of the objective lens.

If the surface normal is tilted with respect to the optical axis then other aberrations such as coma (which includes wavefront tilt, causing a lateral focal shift) are introduced. These effects are proportional to both the focusing depth and the angle of surface tilt. The additional aberration due to a small surface tilt is given by:

$$\varphi_{tilt}(\rho, \theta) = \frac{t\, d_{nom}}{\lambda}(a\rho + b\rho^3)\cos(\theta - \xi)$$

This equation is an analytic description of the aberration component due to surface tilt, where the tilt is at a small angle t. $\theta$ is the azimuthal coordinate in the pupil and $\xi$ represents the orientation of the tilt. Factors a and b are scalar coefficients whose values depend upon the refractive indices and NA.

The combination of spherical aberration and coma causes reductions in the focal intensity and distortions of the intensity distribution that affect the fabrication efficiency and precision.

The effects of refraction at the diamond surface are strong, due to the high refractive index of diamond (refractive index of 2.4, compared to 1.0 for air and around 1.5 for immersion oil). This means that aberration correction will allow production of fine features at depths which would otherwise not be possible. Aberrations correction is readily implemented using a liquid crystal spatial light modulator (SLM), but may also be implemented using a deformable mirror.

While static correction methods are possible, there are indications from various trials that static corrections are not effective at correcting aberrations between nominally similar samples due to slight changes in composition and positioning of the material, and that instead fine-tuned adaptive aberration correction is needed. Therefore, a one-size-fits-all approach cannot achieve the same degree of control as the present method.

The aberration correction demands are increased if using a dry objective lens to focus deep into diamond. The aberration correction requirements are less severe using an oil immersion lens to focus the laser, as the refractive index contrast is lower than with a dry lens. However, correction is still required in this case to obtain viable results.

A phase pattern calculated from the above equations can be imparted upon the aberration correction device (i.e. the active optical element) such as a spatial light modulator (SLM) in order to correct for the aberration induced by the sample. As SLMs typically have a phase modulation range limited to one wavelength (or a small number of wavelengths) the phase is usually wrapped so that it lies within the accessible range. For example, if only a single wavelength is accessible, then the phase function applied will be $\varphi_{SA}$ modulo $2\pi$, as $2\pi$ radians of phase corresponds to one wavelength.

The phase pattern applied to the SLM can be simplified by noting that the spherical aberration term contains defocus, which is another aberration mode or component that shifts the focus (i.e. the peak optical intensity) along the optical axis, but does not change its shape. By removing the defocus component from the correction, the size of the phase correction can be reduced, thus more effectively using the SLM for aberration correction. The defocusing component of the spherical aberration may be compensated by translation of the sample by an appropriate amount. Similarly, the coma aberration for a tilted sample includes a "tilt" aberration, a constant phase gradient that causes lateral shift of the focus. Again, this tilt can be removed from the phase pattern before it is imparted on the SLM. The lateral shift can be compensated by translation of the sample.

Instead of using the analytic expressions directly, the aberrations can be considered as a series of basis functions. Commonly, the Zernike polynomials are used for this purpose. Hence, an aberration may be described a sum of aberration modes. For example, spherical aberration may be expressed as an expansion in terms of Zernike polynomials. Using functions such as these aids in the design of feedback systems for the measurement and correction of unknown aberrations.

The methods described herein are further relevant for focusing through non-planar surfaces. This might include through curved surfaces or near/across edges. Again, an accurate pre-measurement of the surface topography can be used to predict a starting phase pattern that is close to optimum and can be used as a good starting point for subsequent optimisation using focal feedback. Fabricating across or near an edge involves pupil segmentation. The methods described here can be adopted for setting the phase for correcting spherical and coma aberrations in the segmented pupil. Focusing through a curved surface will require correction of a combination of spherical aberration, astigmatism and coma.

Adaptive Control of the Focus

In order to maintain consistent quality of fabrication between different positions (particularly depths) within a sample and between different samples, it is necessary to implement an adaptive control system that can maintain an appropriate combination of aberration correction and pulse energy. This may use a method of feedback from the focal region to the devices controlling the wavefront and energy.

A first measurement of surface position and tilt based upon reflection from the material surface as described above provides a prediction of the correction needed to counteract spherical aberration and coma. In one implementation, a measurement of the position for best optical focus at three points which are not all on the same axis can provide information on the relative sample tilt. This can allow predictive aberration correction for coma and spherical aberration at a particular depth in a sample, e.g. diamond.

Finer compensation may be carried out by observation through a microscope of the fabrication process at the focus. A combination of measurements is possible. Using a transmission microscope it is possible to observe changes in absorption at the focus or a change in optical phase due to refractive index modification. This indicates the degree to which the material is modified by the laser pulse and can provide a feedback signal for optimisation of the aberration correction and the pulse energy. Alternative feedback signals could be provided by photoluminescence or plasma emission from the focus.

In order to reduce the number of measurements required (and hence the time taken) for the optimisation process, algorithms can be used in which coefficients of the aberration modes (particularly spherical aberration and coma) and the pulse energy are considered as unknown coordinates in a search space.

The optimisation process can be expressed mathematically as the minimisation of a cost function f (or alternatively, g may be a merit function that should be maximised) that is related to the aberration components and the pulse energy, collectively represented by the symbol P. The optimal value of P is given by either $$P_{opt} = \arg\min_P[f(P)]$$

where the cost function should be minimised or $$P_{opt} = \arg\min_P[g(P)]$$

where the merit function should be maximised. The function for g can be defined as a combination of measurements. For example, the intensity of the focal plasma generated during laser fabrication is dependent upon the total aberration content, so that a corrected system shows a maximum in focal plasma emission. Alternatively, the fabrication laser may be used below the threshold for structural modification to non-linearly excite photoluminescence (PL) from intrinsic defects contained in the sample. The detected PL is maximised when the aberrations are minimised. Similarly, luminescence or fluorescence emission in a confocal microscope is maximised when the aberrations are corrected. These signals can therefore be used as a feedback mechanism to allow optimisation of the cost/merit function.

Various methods are possible for the implementation of optimisation processes. The minimum number of unknown parameters that need to be optimised for laser fabrication through a tilted flat surface, where the refractive indices and NA are known, is three: one coefficient of spherical aberration, and two for coma (i.e. the two orthogonal coma components). The process may therefore be considered as a three-dimensional optimisation problem. Another variable in the form of pulse energy can be considered, which then extends the process to a four-dimensional optimisation. If there are further unknowns, then more variables (dimensions) would have to be considered in the optimisation process.

Adaptive optimisation could be performed on a point-by-point basis for every fabricated position, though it is likely to be more practical to perform fewer optimisation measurements across the field of fabrication and perform interpolation of parameters across this field. This field could exist in a line or curve, a lateral plane, or extend through three dimensions. With sufficient surface measurements, a suitably corrected focus (i.e. with a sufficiently large Strehl ratio) can be achieved. However, an optimisation procedure may be performed for each new sample.

Description of Larger Scale Markings

Larger scale structures and markings are also possible. This might include point like features or continuous lines to create alphanumeric characters, barcodes, QR codes or images. Such features could be grouped together to form diffractive elements, holograms, or diffraction gratings. Depth ranges and areas can be up to the size of the stone being used (typically in the range of 3 mm in the transverse x- and y-directions, and 1 mm in the propagation z-direction). The size of the features may be up to 5 μm across (in x- and y-directions) by 20 μm in the propagation z-direction. In practice, if larger features are to be created reliably, it may be achieved by stitching together combinations of smaller scale modifications. Care must be taken when generating large features to manage the stress load on the surrounding sample (e.g. diamond) to avoid large scale irregular cracks forming. This might be achieved by a sparse array of small (~1 μm scale) features that are linked together to form a feature that looks large when viewed optically but only has minimal volume conversion of diamond to graphite.

Schematic Diagram of Typical Implementation

Figure 4:
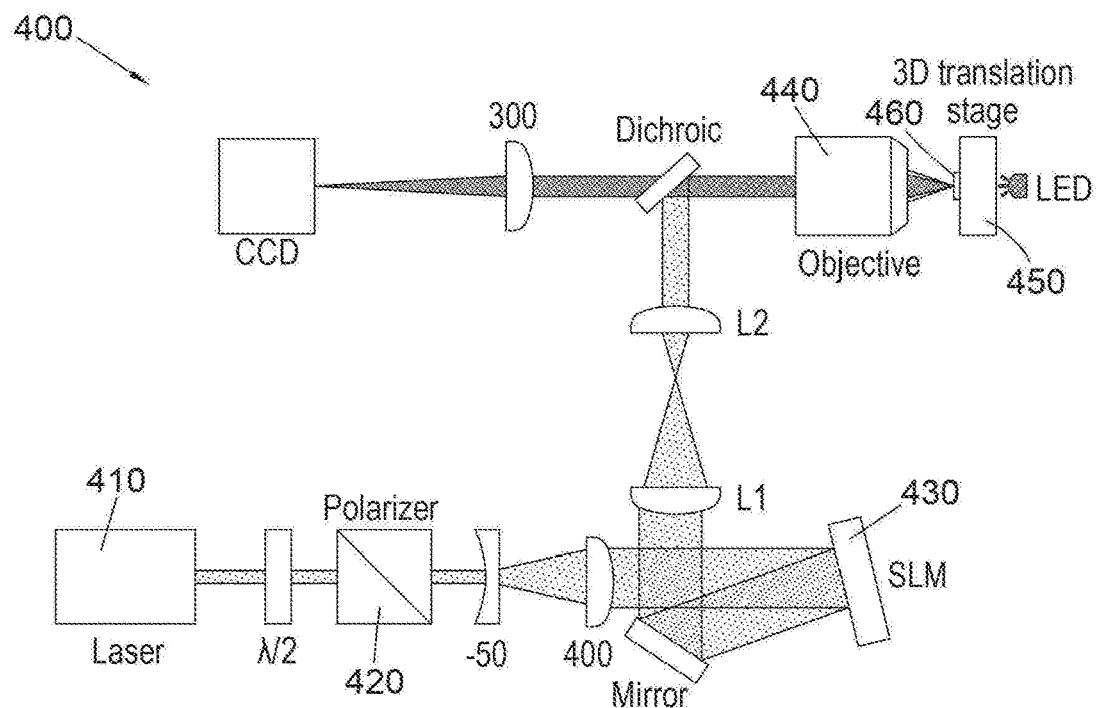
FIG. 4 shows an exemplary laser system for laser modification of a sample.

FIG. 4 shows an exemplary configuration for the adaptive fabrication system. Additional components might be added in order to, for example, aid with the aberration or position sensing, to perform additional aberration correction, or to parallelise the system and use multiple focal spots.

The laser system 400 includes a laser 410, a polarizer 420, a spatial light modulator (SLM) 430, a high NA objective lens 440, and a three-dimensional translation stage 450. A sample 460 is positioned on the stage 450 at the focus of the system 400.

The sample 460 is diamond and is positioned in the laser system 400 for modification by the laser 410. The sample 460 is then measured to inform the determination of a correction. Particularly the surface of the sample 460 on which the laser will be incident is measured and its inclination from transverse is determined. The transverse direction is the 2D plane perpendicular to the primary propagation direction of the laser. This is also the plane parallel to the major plane of the objective lens.

The inclination of the surface of the sample 460 is used to determine the expected coma aberration which will be caused thereby on the laser focus. The expected aberration is then characterised in terms of a Zernike mode, and is communicated to the SLM. The SLM is modified to display the required phase correction to modify the laser to counteract the aberration.

The pulse energy of the laser system is also determined based upon the correction. The laser is set to the required pulse energy, and is then used to modify the diamond sample.

Following modification, the modified region of the sample is measured using transmission microscopy. The determined correction is then refined based upon the feedback obtained by this further measurement. The refined correction is applied to the SLM and the sample is laser modified.

EXAMPLE

The diamond is mounted in the laser fabrication system. The objective lens is moved axially (i.e. in the z-direction) to initially find the diamond surface by maximising the reflected light from an LED. The diamond is moved in the transverse (x-y) directions to the desired location for fabrication.

The fine positioning for the surface axial (z) location is achieved using the laser with low pulse energy (significantly below the bulk graphitisation threshold, e.g. less than 30 ml). The sample surface is found by translating the diamond axially in 100 nm steps. If using an oil immersion lens, the diamond is moved to the point at which the laser no longer boils the immersion oil. If using an air lens, the diamond is moved until the laser no longer causes any mark on the diamond surface. A further two such measurements are made, one by translating 0.2 mm in the x-direction, the other by translating 0.2 mm in the y-direction. These measurements cover an area of the sample and are used to determine the local surface tilt.

The diamond is then translated axially to the desired depth for fabrication, noting that the actual fabrication depth is greater than the translation depth by a factor of approximately 2 for high NA oil lenses and about 2.7 for a high NA air lens. This is because the SLM is used to correct all aberrations caused by refraction at the sample interface, except defocus, which is more simply counteracted by axial translation of the diamond, as described above.

The aberration correction is applied to the SLM based upon the surface measurements. The correction represents a spherical aberration correction based upon the translated axial depth, and coma aberration in the x and y directions based upon the measured x and y surface tilt. A predetermined pulse energy (e.g. 100 nJ for a 1.4 NA oil lens using 780 nm wavelength light with pulse duration 250 fs) is used and a burst of 5 pulses is fired into the diamond. A transmission microscope is used to verify that there has been successful modification of the diamond at the desired point. The preferred fabrication should have dimensions of approximately 0.5 μm (in the transverse direction) by approximately 1 μm (in the axial direction) and will appear dark when viewed in a transmission microscope.

Aberrations also need to be compensated in the imaging in order to see the fabrication. Then it is verified that the diamond can still be modified with lower pulse energy and/or dose to the point that the modification becomes invisible. The desired pattern is then fabricated within the diamond as desired. When there is a tilt to the sample, the transverse movements of the diamond are accompanied with axial movements to ensure the fabricated points remain a constant depth beneath the diamond surface. If a 3D fabricated design is required the phase pattern displayed on the SLM is automatically updated during fabrication based upon feedback from the translation stages.

If no modification is visible when the diamond is irradiated with the first burst of pulses, the sample is translated a small distance in the transverse direction (e.g. 5 μm) and the aberration modes applied to the SLM are adjusted in a systematic manner with a burst of the laser applied for each setting. The diamond is axially translated between each burst and checked to see whether the diamond is modified as desired. Once the correct phase is displayed upon the SLM the fabrication is carried out straightforwardly as described above without need for further adaptive correction.

Other metrics might be used to optimise the SLM phase other than visible diamond modification, for example nonlinear photoluminescence from the diamond caused by the laser focus might be optimised to correct the aberrations. For this measurement the laser pulse energy is dropped to ensure there is no fabrication (pulse energy below e.g. 20 nJ using conditions described above) or ideally by switching to a laser with a higher repetition rate and low pulse energy (80 MHz rep rate and pulse energy <20 nJ). The characteristics of the focus may be measured and the aberrations affecting it determined. Then a correction can be determined and applied to the active optical element to improve the Strehl ratio of the focus. The need for such a procedure of adaptive correction may be rare given accurate measurements of the surface.

The above method may use a femtosecond infra-red fabrication laser to modify the fibre, but the techniques may also be applied to fabrication systems of any wavelength or any pulse width. For example ultraviolet (UV) and continuous-wave (CW) systems can be used. Typically the fabrication laser induces an increase in refractive index of the sample. However in some materials the laser can induce a decrease in refractive index. The optical devices manufactured may operate at a different wavelength to the writing laser. Devices may be manufactured for any operating wavelength of the optical device.

The invention claimed is:

1. A method for laser modification of a sample comprising diamond or gemstone to form a modified region at a target location within the sample, comprising:
    positioning a sample comprising diamond or gemstone in a laser system for modification by a laser;
    measuring tilt of a surface of the sample through which the laser focusses;
    using at least the measured tilt to determine a correction to be applied to an active optical element of the laser system;
    applying the correction to the active optical element to modify wavefront properties of the laser to counteract an effect of coma on laser focus; and
    laser modifying the sample at the target location using the laser with the corrected wavefront properties to produce the modified region.

2. A method as claimed in claim 1, further comprising measuring the position of the sample within the laser system;
    using also the measured position to determine a fabrication depth and the correction to be applied to the active optical element of the laser system.

3. A method as claimed in claim 1, further comprising applying the correction to the active optical element to modify wavefront properties of the laser to counteract an effect of spherical aberration on laser focus.

4. A method as claimed in claim 1, further comprising measuring the sample after forming the modified region, and modifying the correction applied to the active optical element based on the further measurement.

5. A method as claimed in claim 1, wherein laser focus has a Strehl ratio of greater than 0.5.

6. A method as claimed in claim 1, further comprising measuring a focus of the laser within the sample, and modifying the correction applied to the active optical element based on the measured focus.

7. A method as claimed in claim 1, wherein determining a correction is based at least in part on a pulse energy of the laser.

8. A method as claimed in claim 1, further comprising laser modifying the sample using a single laser pulse; and/or comprising laser modifying the sample using a plurality of laser beams.

9. A method as claimed in claim 1, wherein forming a modified region includes using non-linear optical interactions to cause modification of the material.

10. A method as claimed in claim 1, wherein forming a modified region comprises modifying only material within the bulk of the sample.

11. A method as claimed in claim 1, further comprising using a sample comprising diamond.

12. A method as claimed in claim 1, wherein determining a correction comprises calculating coefficients of a Zernike expansion.

13. A method as claimed in claim 1, wherein the correction counteracts the effects on the focus of tilt aberration caused by the sample.

14. A method as claimed in claim 1, further comprising using a pulsed laser with pulse energies of between 10 nJ and 300 nJ.

15. A method as claimed in claim 1, further comprising modifying a region less than 1 micrometre in the propagation direction.

16. A laser system for laser modification of a sample to form a modified region at a target depth within the sample, comprising:
    a measurement device arranged to measure tilt of a sample, wherein the sample comprises diamond or gemstone.

17. A laser system as claimed in claim 16, further comprising a processor and an active optical element, wherein the processor is configured to determine a correction to be applied to the active optical element using measured tilt of the laser system, and to communicate the correction to the active optical element.

18. A laser system as claimed in claim 17, wherein the active optical element is configured to modify wavefront properties of the laser to counteract an effect of coma on laser focus; and/or wherein the active optical element is configured to modify wavefront properties of the laser to counteract an effect of spherical aberration on laser focus.

19. A laser system as claimed in claim 16, arranged to perform a method for laser modification of the sample to form a modified region at a target location within the sample, further comprising:
    positioning a sample in a laser system for modification by a laser;
    measuring tilt of a surface of the sample through which the laser focusses;
    using at least the measured tilt to determine a correction to be applied to an active optical element of the laser system;
    applying the correction to the active optical element to modify wavefront properties of the laser to counteract an effect of coma on laser focus; and
    laser modifying the sample at the target location using the laser with the corrected wavefront properties to produce the modified region.

20. A method for laser modification of a gem stone to form a modified region at a target location within the gem stone, comprising:
    positioning a gem stone in a laser system for modification by a laser;
    measuring a focus of the laser within the gem stone;
    using at least the measurement of the focus to determine a correction to be applied to an active optical element of the laser system;
    applying the correction to the active optical element to modify wavefront properties of the laser to counteract an effect of aberration on laser focus; and
    laser modifying the gem stone at the target location using the laser with the corrected wavefront properties to produce the modified region.

21. A method as claimed in claim 20, wherein applying the correction to the active optical element results in a laser focus with a Strehl ratio of greater than 0.5.

22. A method as claimed in claim 20, wherein the correction counteracts an effect of coma aberration on laser focus; and/or wherein the correction counteracts an effect of spherical aberration on laser focus.

* * * * *